United States Patent [19]

Bowerman

[11] 4,099,291
[45] Jul. 11, 1978

[54] VACUUM CLEANER HAVING MAGNETIC DRIVE FOR AGITATOR BRUSH

[76] Inventor: Leonard E. Bowerman, 282 Glen Ridge Rd., Fairfield, Conn. 06430

[21] Appl. No.: 802,413

[22] Filed: Jun. 1, 1977

[51] Int. Cl.² .............................................. A47L 5/30
[52] U.S. Cl. ..................................................... 15/390
[58] Field of Search ................... 15/389, 390; 310/103, 310/104

[56] References Cited

U.S. PATENT DOCUMENTS

| 1,953,340 | 4/1934 | Doemling | 15/389 |
| 2,437,871 | 3/1948 | Wood | 310/103 |
| 3,267,310 | 8/1966 | Ireland | 310/103 |
| 3,608,333 | 9/1971 | Selley et al. | 15/389 X |

*Primary Examiner*—Christopher K. Moore

[57] ABSTRACT

In accordance with the present invention, the agitator brush in the suction nozzle of an upright vacuum cleaner is positively driven by the high speed fan motor through reduction gearing, including a torque-limiting magnetic drive, which will disengage in the event the agitator brush is stalled or overloaded to thus prevent damage to the motor and conversely will limit the value of the torque transmitted to the agitator in order to minimize the damage done to whatever has stalled the brush. In some cases the value of the torque at which the magnetic drive is designed to disengage may be lower than that required to overcome the frictional resistance to turning of the agitator on the rug being cleaned plus the inertia load of the driven system during the rapid acceleration from start to full speed, which results if the motor is initially supplied with full line voltage. Hence, the invention includes means which may be employed in such cases for automatically reducing the rate of acceleration of the motor during starting, thus reducing the inertia load.

10 Claims, 8 Drawing Figures

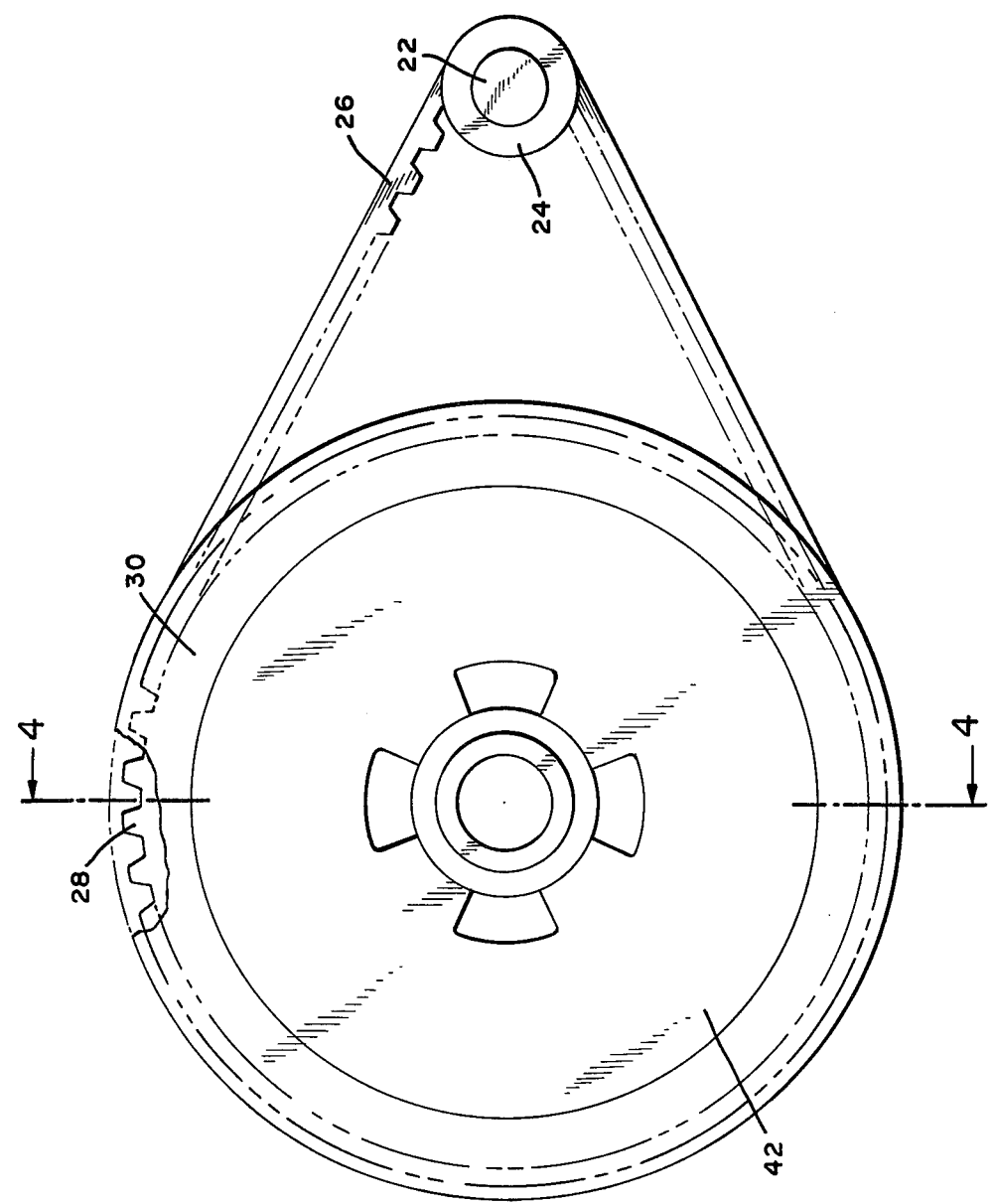
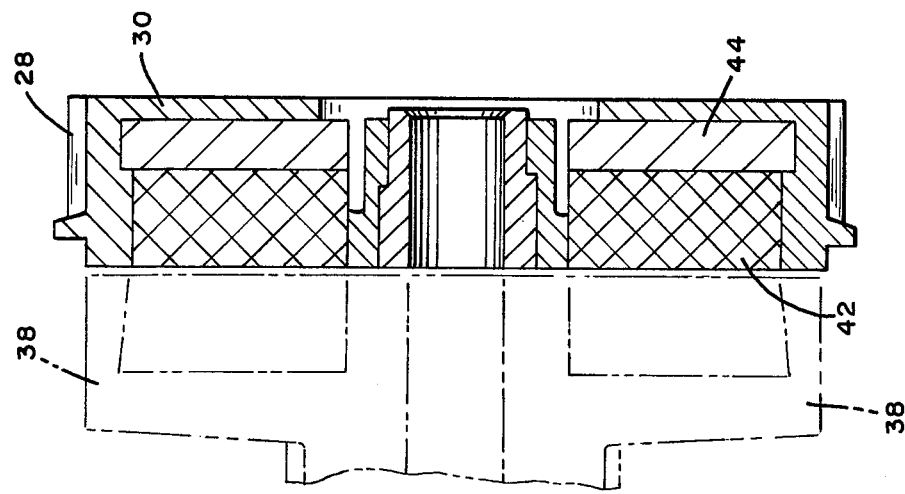

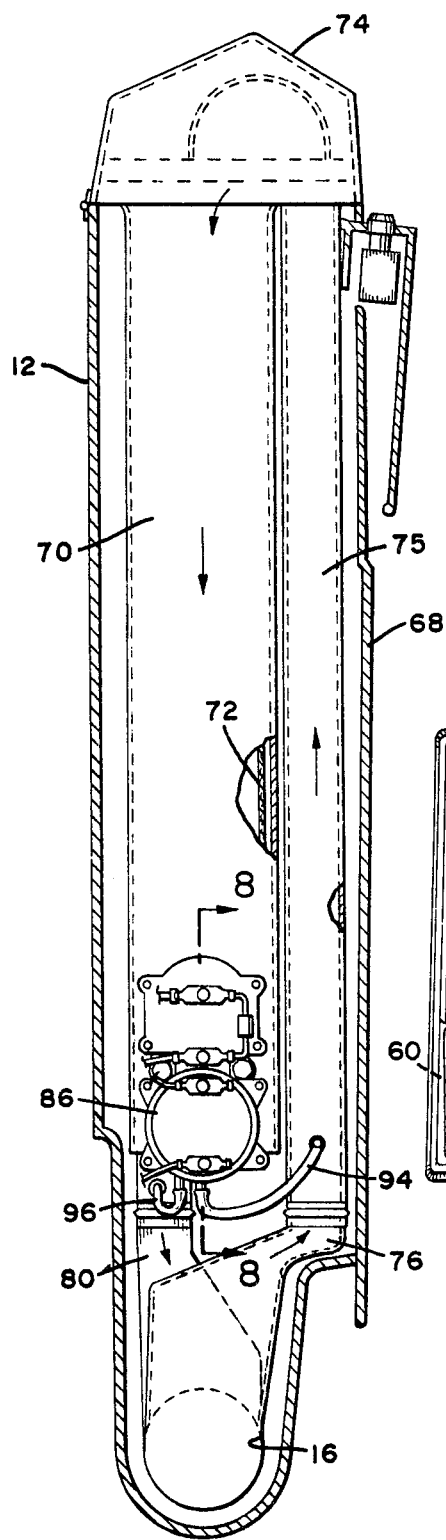
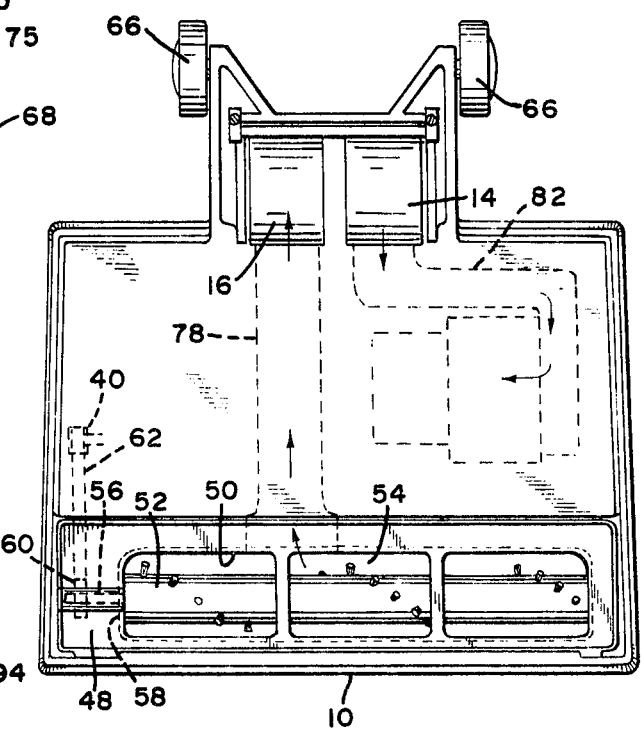

VACUUM CLEANER HAVING MAGNETIC DRIVE FOR AGITATOR BRUSH

BACKGROUND OF THE INVENTION

It has long been the practice to drive the agitator in the nozzle of an upright vacuum cleaner by the fan motor through a simple friction belt drive, but in such cleaners the dirt-laden air from the nozzle passed through the fan before entering the dust bag and the type of fan capable of handling dirty air required a large heavy impeller driven at a slow speed. The impeller, which was mounted directly on the motor shaft, had greater inertia than the agitator and hence acted to limit the rate of acceleration and if it were a little too great, the friction belt could slip without undue damage. Likewise if the agitator were stalled, the belt could slip and thus prevent motor stalling and consequent overheating of the motor. A belt and drive system of this type could also slip under normal operating conditions and thus reduce the speed of the agitator and introduce possible belt wear.

On the other hand, in cleaners in which the dirty air is first passed through the dust bag so that only clean air passes through the fan, a small, lightweight impeller driven at high speed, in the neighborhood of 20,000 rpm and producing a high suction, may be employed. In such cleaners, however, it has been the practice to provide a separate small lower-speed motor for driving the agitator through a positive drive, such as a toothed timing belt, and protecting the motor from damage resulting from a stalled agitator by means of an overload circuit breaker, as is shown in U.S. Pat. No. 3,266,078 issued Aug. 16, 1966.

SUMMARY OF THE INVENTION

The invention involves a torque-limiting magnetic drive between the high speed fan motor of a vacuum cleaner and the agitator in the suction nozzle, the drive being designed to disengage at a maximum desired value of torque transmission. If the additional torque required to overcome the inertia of the driven system is too high when the motor is accelerated at a normal rate from standstill to full speed, means may be provided for limiting the rate of acceleration of the motor. The preferred means for limiting the acceleration rate is the provision of a diode which is initially connected in the motor circuit so as to supply only half-wave line voltage to the motor during starting. Even at this reduced speed, the fan produces sufficient suction to actuate, preferably through a throttled passage providing a time delay, a pneumatically controlled switch to cut the diode out of the motor circuit, thus automatically permitting the motor to accelerate further to full speed.

DESCRIPTION OF THE FIGURES

FIG. 3 is a cross-sectional view on an enlarged scale taken on line 3—3 of FIG. 2;

FIG. 4 is a cross-sectional view taken on the line 4—4 of FIG. 3;

FIG. 6 is a bottom view on a reduced scale of the lower portion of the cleaner shown in FIG. 5;

FIG. 7 is a cross-sectional view of the upper portion of the vacuum cleaner shown in FIG. 1.

Figure 1:
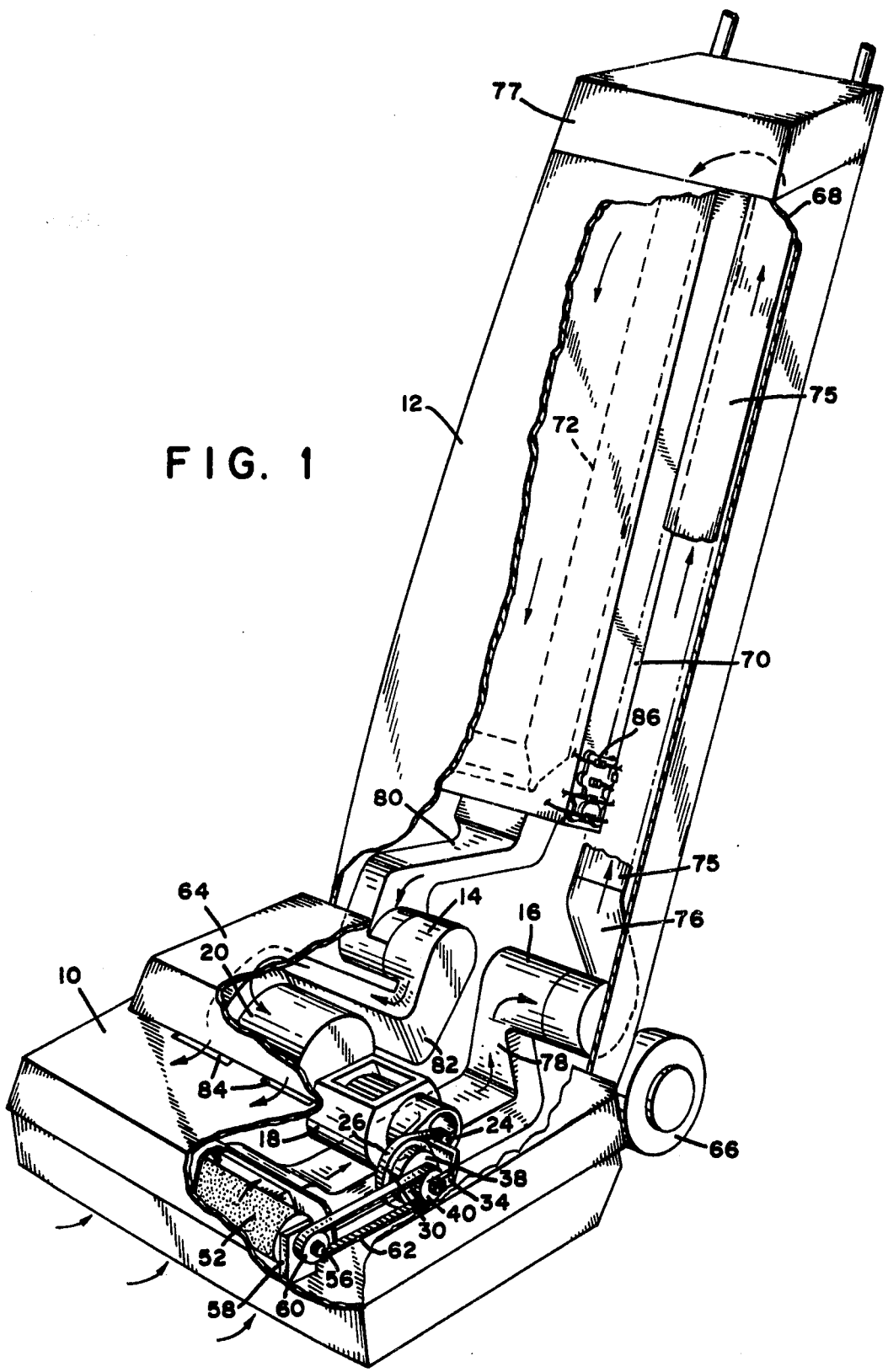
FIG. 1 is a perspective view, partially broken away, showing the path of air flow through a vacuum cleaner in accordance with my invention.
Figure 2:
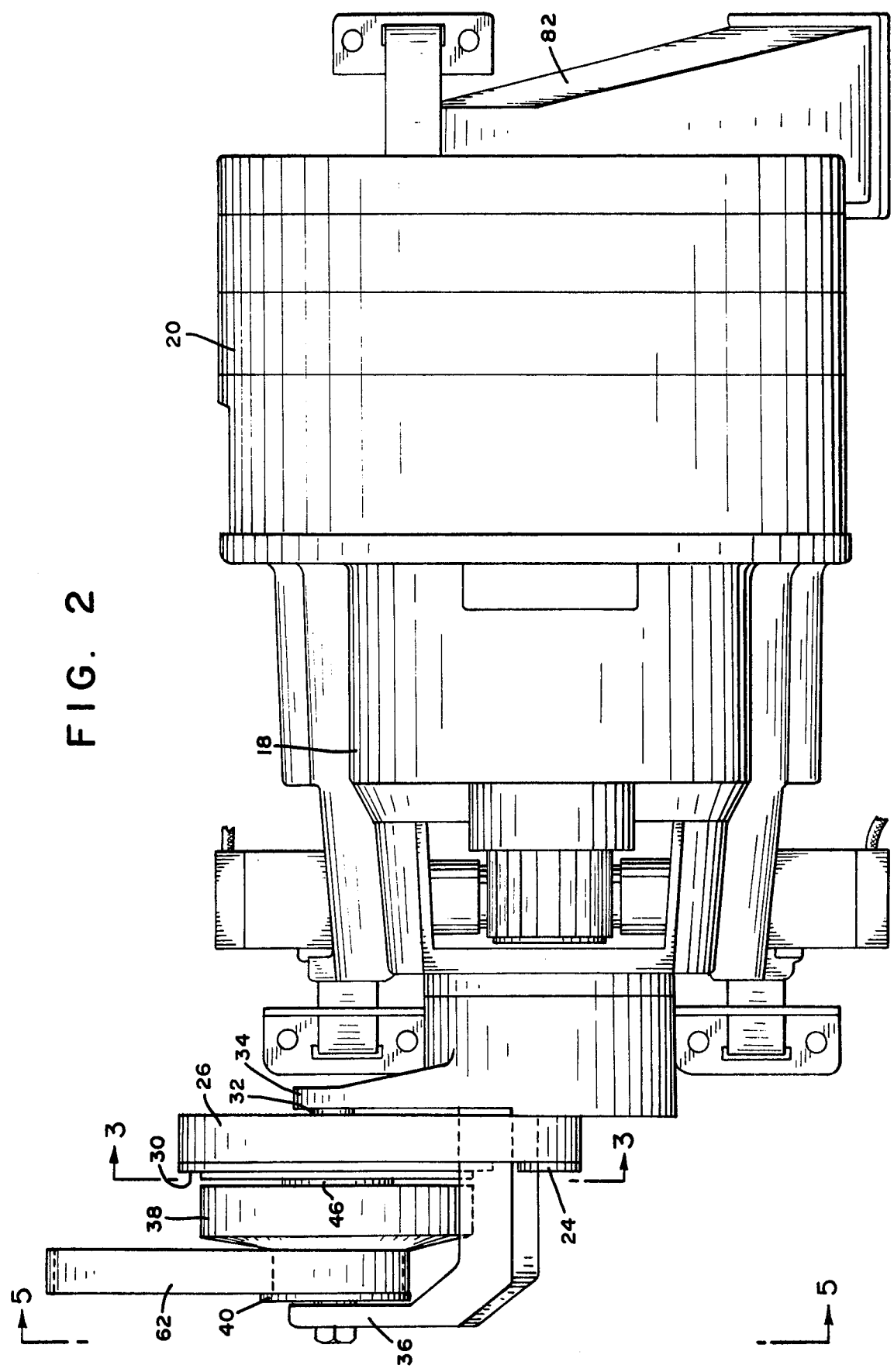
FIG. 2 is a top elevational view of a power unit including an electric motor, centrifugal fan, speed reduction drive, and magnetic drive forming part of the vacuum cleaner shown in FIG. 1.

Referring to the drawings and particularly to FIG. 1, reference character 10 designates the lower or base portion of a so-called upright vacuum cleaner, while reference character 12 designates the upper portion, the two portions being pivotally connected together by a pair of axially aligned hollow trunnions 14 and 16. Mounted in base portion 10 is a power unit, shown more particularly in FIG. 2, and including a high-speed electric motor 18 coupled directly to a preferably multistage clean air centrifugal blower or fan 20, the impellers of the blower being of light weight and mounted on one end of the motor shaft 22. The other end of the shaft carries a small pinion 24 which drives through a toothed timing belt 26, a large sprocket wheel 28 formed on the periphery of the driving element 30 of a magnetic drive which is rotatably mounted on a shaft 32 carried by brackets 34 and 36 secured to the frame of motor 18. Also rotatably mounted on shaft 32 is the driven element 38 of the drive, which has formed integral therewith a small sprocket wheel 40.

The construction of driving element 30 is best seen from FIG. 4 and consists of an annular permanent magnet 42 and an annular soft steel magnetic flux plate 44 molded within the plastic sprocket wheel 28. The magnet 42 is so charged as to produce a plurality of magnetic poles on its exposed face, that is, the face remote from flux plate 44. The driven element 38 of the magnetic drive is similarly constructed as far as its magnetic features are concerned, but the small sprocket 40, being of much smaller diameter than the element 38, is located at one side thereof. A thin thrust washer 46 is disposed around shaft 32 between the two elements 30 and 38 in order to maintain the faces of the element out of contact. Variation in the length of the air gap thus provided varies the value of the maximum torque which may be transmitted without causing disengagement, and this may be varied by selecting washers of different thicknesses.

Figure 5:
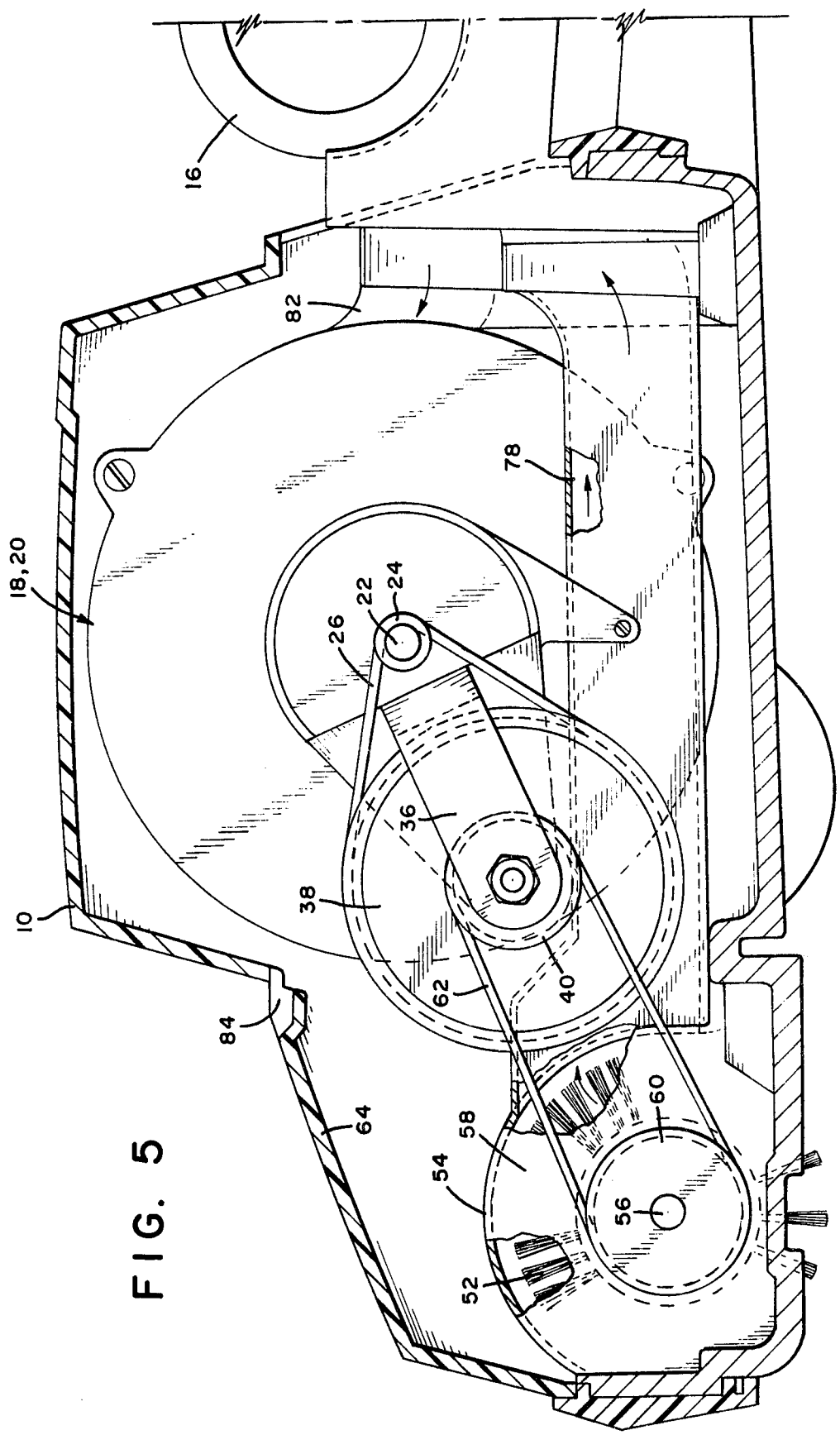
FIG. 5 is a cross sectional view on an enlarged scale of the lower portion of the vacuum cleaner shown in FIG. 1 looking in the direction of the arrows 5—5 of FIG. 2.

As shown particularly in FIG. 6, the bottom wall 48 of base portion 10 is formed with an elongated opening 50 above which is rotatably mounted a surface agitator brush 52 having rows of bristles of sufficient length to extend through the opening and to contact the surface being cleaned. Opening 50 communicates with a chamber or tunnel 54 (FIG. 5) surrounding the agitator 52. The shaft 56 of the agitator extends through a wall 58 at one end of the tunnel and has secured thereto a toothed pinion 60 which is driven from sprocket 40 through a toothed timing belt 62. The various above-described parts mounted in the base portion 10 are enclosed within a hood 64, and the rear of the base portion is supported on the surface to be cleaned by a pair of wheels 66.

The upper portion 12 of the vacuum cleaner, as best seen in FIGS. 1 and 7, comprises an outer housing 68 within which is secured an airtight inner body 70 adapted to receive a disposable dust bag 72 which may be inserted and removed through the open top of body 70 when a hinged cover 74 is opened. Disposed within housing 68 along side of body 70 is a conduit 75, the upper end of which communicates with the interior of cover 74 which, when closed, conveys air and dirt from conduit 75 to the inlet of dust bag 72.

The lower end of conduit 75 is connected to a conduit 76 which communicates through hollow trunnion 16 with a conduit 78 leading from an opening in the rear of tunnel 54. A conduit 80 is connected to the lower end of inner body 70 and communicates through hollow trunnion 14 with a conduit 82 leading to the inlet of fan 20. Air discharged from the fan passes through the housing of motor 18, serving to cool the motor, and is discharged therefrom to the interior of hood 64 from whence it passes to atmosphere, as through vents 84.

Figure 8:
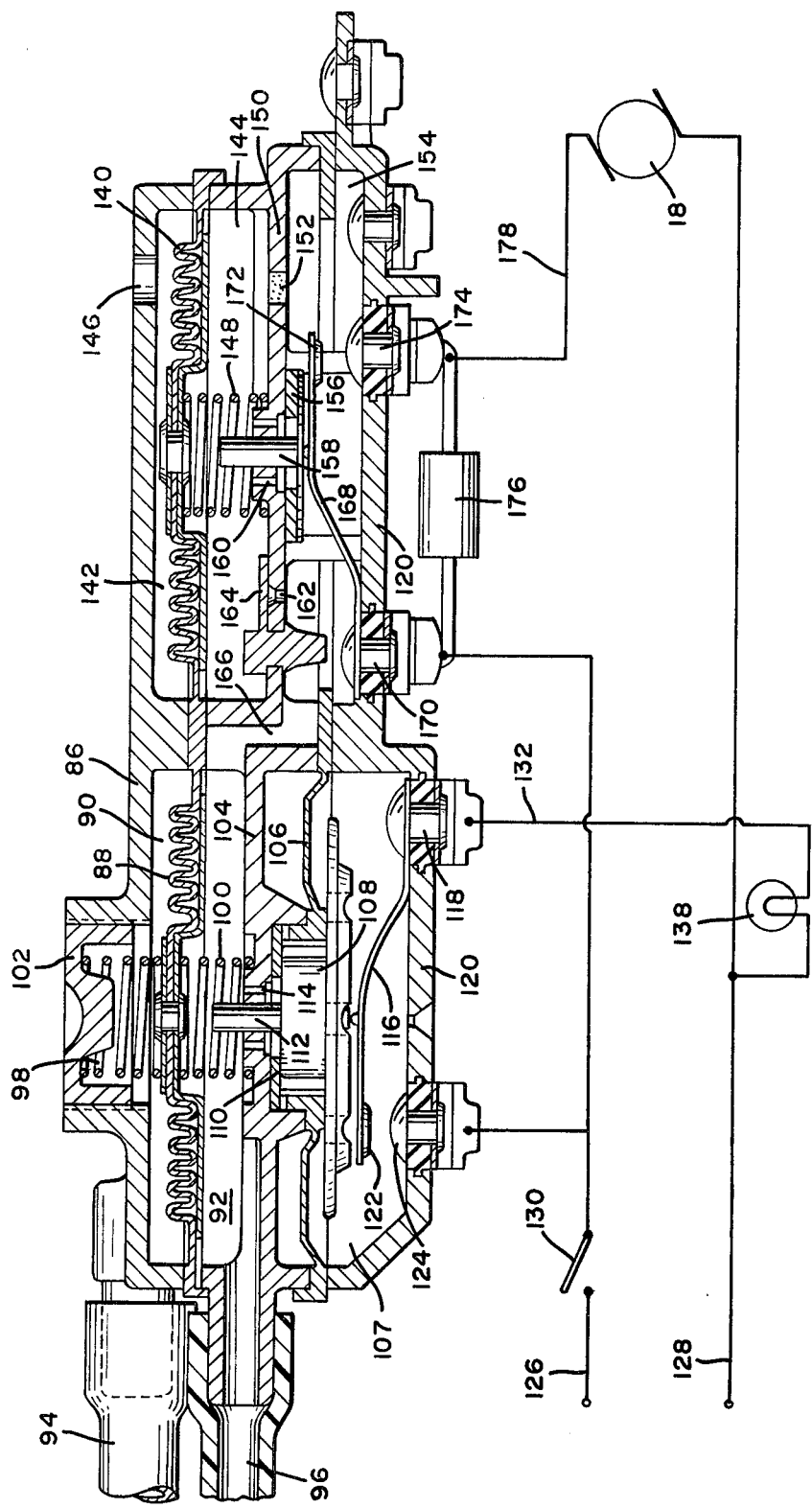
FIG. 8 is a cross-sectional view on an enlarged scale taken on the line 8—8 of FIG. 7 of a control unit and a wiring diagram of an electric circuit controlled thereby.

In the event reduction in the rate of acceleration during starting of motor 18 is desired, a pneumatic control unit 86, which is shown in detail in FIG. 8, may be mounted on inner body 70 within housing 68 (FIGS. 1 and 7). This unit contains a first diaphragm chamber in which a diaphragm 88 is disposed, dividing the chamber into an upper compartment 90 and a lower compartment 92. The upper compartment communicates through a tube 94 with conduit 75, while the lower compartment communicates through a tube 96 with conduit 80. Diaphragm 88 is urged in opposite directions by compression springs 98 and 100, the force exerted by the former being adjustable by means of a threaded plug 102, while the latter abuts against a fixed wall 104 forming part of unit 86. Disposed below wall 104 and above a chamber 107 is a diaphragm 106 to the center of which is secured a valve structure 108, which cooperates with a seat 110 on the lower surface of wall 104 and which has a stem 112 extending loosely through an opening in wall 104. One or more openings 114 are formed in wall 104 to establish communication between compartment 92 and the opening through valve seat 110. A resilient arm 116 is secured at one end to an electric terminal 118 extending through a bottom wall 120 of unit 86. An intermediate point of arm 116 bears against valve structure 108 and urges the valve against seat 110, while the free end of the arm carries a movable contact 122 which cooperates with a fixed contact on a terminal 124 extending through wall 120.

Conductors 126 and 128 supply current for the vacuum cleaner, a manually operable switch 130 being connected in conductor 126. Terminal 124 is connected to conductor 126, while a conductor 132 connects terminal 118 to one side of a signal lamp 138, the other side of which is connected to conductor 128.

Control unit 86 also contains a second diaphragm chamber in which is disposed a diaphragm 140 dividing the chamber into an upper compartment 142 and a lower compartment 144, the former being open to atmosphere through an aperture 146. A compression spring 148 is disposed between diaphragm 140 and the bottom wall 150 of compartment 144 so as to bias the diaphragm upwardly. A sintered metal plug 152 provides restricted communication between compartment 144 and a chamber 154 below the wall. A valve 156 is disposed in chamber 154 and has a stem 158 extending through wall 150, the latter being formed with one or more openings 160 connecting compartment 144 with valve 156. Wall 150 is also formed with a port 162 controlled by a check valve 164 which permits flow from chamber 154 to compartment 144. A passageway 166 connects compartment 92 with chamber 154. A resilient arm 168 has one end secured to an electric terminal 170 which extends through bottom wall 120. A mid-point of arm 168 bears against valve 156 and biases the valve toward closed position. The free end of the arm carries a movable contact 172 which cooperates with a fixed contact on terminal 174 extending through wall 120. Conductor 126 is connected to terminal 170, a diode 176 is connected between terminals 170 and 174, and a conductor 178 connects the latter terminal to one side of motor 18, the other side of which is connected to conductor 128.

OPERATION

Assume first that the vacuum cleaner is not provided with means for limiting the rate of acceleration of the motor 18 from standstill. In this event, diode 176 and the pneumatic control therefor would be omitted and motor 18 would be connected directly across conductors 126 and 128 in series with manual switch 130.

Closing of switch 130 causes motor 18 to start and drive the impellers of blower 20, which are mounted on motor shaft 22, and to drive agitator 52 through small pinion 24, timing belt 26, driving element 30 and driven element 38 of the magnetic drive, belt 62, and pinion 60. The small pinion 24, belt 26, and the large sprocket 28 on driving element 30 effect a speed reduction. Rotation of the agitator 52 causes the bristles thereof to dislodge dirt from the surface being cleaned. Inasmuch as the blower is required to handle only clean air, the impellers may be of light weight and adapted to be driven at high speed so as to produce a high suction which causes air to be drawn in through nozzle opening 50 to brush tunnel 54 from where it passes through conduit 78, hollow trunnion 16, conduits 76 and 75 and cover 77 to the interior of dust bag 72. Dust and dirt picked up from the surface being cleaned by the air stream entering nozzle opening 50 is deposited in the dust bag, while clean air passes through the walls of the bag into inner body 70 and through conduit 80, hollow trunnion 14, and conduit 82 to the inlet of blower 20. From the blower the air is discharged through motor 18, serving to cool the latter, into hood 64, from where it passes through openings such as 84 to atmosphere.

Collection of dirt in dust bag 72 causes an increase in the pressure drop of air passing therethrough, which results in an increase in the vacuum existing in conduit 80 and a relative decrease in the vacuum in conduit 75. These pressures are communicated through tubes 96 and 94 to compartment 92 below diaphragm 88 and compartment 90 above the diaphragm, respectively, causing the latter to be deflected downwardly against the resistance of spring 100.

When the pressure drop through the dust bag reaches a value indicating that the bag should be removed and replaced with a clean one, diaphragm 88 is deflected into contact with stem 112 and unseats valve 110 so as to place chamber 107 in communication with the low pressure existing in compartment 92. This causes diaphragm 106 to move valve 110 quickly against the resistance of resilient arm 116 so as to close the circuit through contact 122 and terminal 124 to thereby light signal lamp 138 to inform the operator of the need for replacing the dust bag.

If for any reason during the operation of the vacuum cleaner the value of the torque required to drive the agitator 52 exceeds that for which the magnetic drive is designed to transmit, the driven element 38 will immediately stop while the driving element 30 continues to rotate, thus protecting the motor and belts from damage. Thus, if the agitator is suddenly stalled as by a solid object becoming wedged against it in the nozzle opening or by the fringe of a rug or piece of cloth becoming wound around it, the magnetic drive will immediately disengage before damage results.

If it is desirable to limit the torque which the magnetic drive may deliver to a value less than the sum of the torque necessary to overcome the inertia of the agitator when it is very rapidly accelerated during starting and the torque necessary to drive it in contact with a deep pile rug, the means for limiting the rate of acceleration of the motor, including the diode 176, may be employed. In this case, closing switch 130 completes a circuit to motor 18 through diode 176 and consequently the motor receives only half-wave line voltage, which causes it to accelerate at a slower than normal rate and to attain a top speed which is less than normal. This reduces the torque required to overcome the inertia of the agitator 52, with the result that the magnetic drive does not disengage.

Operation of the blower 20 even at this reduced speed produces sufficient suction to evacuate air through conduit 82, hollow trunnion 14, conduit 80, tube 96, compartment 92, passageway 166, chamber 154 and sintered plug 152 from compartment 144. The restriction to flow caused by plug 156 provides a time delay to assure that the motor will not be supplied too quickly with full line voltage. When a sufficient vacuum prevails in compartment 144, diaphragm 140 will be distorted until it contacts and depresses stem 158 to open valve 156, which establishes unrestricted communication between chamber 154 and compartment 144. This in turn causes diaphragm 140 to quickly move valve 156 further against the resistance of resilient arm 168 so as to close the circuit through contact 172 and terminal 174, thus shunting diode 176 out of the motor circuit and supplying motor 18 with full line voltage. This causes the motor to accelerate further to normal full speed. It will thus be seen that the acceleration from standstill to full speed has been divided into two steps and hence the rate of acceleration is less than it would be if the motor initially received full line voltage.

As long as the motor continues to run, diaphragm 140 will be distorted so as to retain contact 172 closed. When the motor and blower are stopped, as by opening switch 130, atmospheric pressure is quickly established throughout the entire system. However, due to the restricted flow through sintered plug 152, the low pressure in compartment 144 would persist, and hence the diode shunt circuit would remain closed for some time if it were not for check valve 164, which opens as soon as the pressure in chamber 154 exceeds that in compartment 144 to thus quickly bring the pressure in compartment 144 up to atmospheric which immediately opens the diode shunt circuit. This is of importance in the event the operator should close switch 130 shortly after opening it. Without check valve 164, diode 176 would still be shunted and motor 18 would start on full line voltage, which would be apt to cause the magnetic drive to disengage.

While there has been described a more or less specific embodiment of the present invention, it is to be understood that this has been done for the purpose of illustration only, and that the scope of the invention is not to be limited thereby, but is to be determined by the appended claims.

I claim:

1. In a vacuum cleaner, a suction nozzle, a surface agitator rotatably mounted in said nozzle, an electric motor, a circuit for supplying current to said motor, a magnetic torque-limiting drive having a driving member including a magnet and a driven member including a magnet, means for positively driving said driving member by said motor, and means for positively driving said agitator by said driven member.

2. A device as set forth in claim 1 wherein at least one of said means for positively driving includes a toothed timing belt.

3. A device as set forth in claim 1 wherein said driving and driven members are mounted coaxially with means for maintaining an air gap therebetween, the variation in length of which varies the value of the maximum torque which may be transmitted between said member.

4. A device as set forth in claim 3 in which the last-mentioned means consists of a thrust washer, the thickness of which determines the length of said air gap.

5. A device as set forth in claim 1 including means for limiting the rate of acceleration of said motor from standstill to full speed.

6. A device as set forth in claim 5 wherein the means for limiting acceleration includes voltage-reducing means in said circuit, and means for automatically switching said voltage-reducing means out of said circuit shortly after said motor has started.

7. A device as set forth in claim 6 including a centrifugal blower driven by said motor, and in which said means for automatically switching includes a diaphragm subject to air pressure created by said blower when said motor starts, said means for automatically switching being actuated by deflection of said diaphragm caused by said air pressure, and means for delaying the action of said air pressure on said diaphragm.

8. A device as set forth in claim 6 wherein said voltage-reducing means includes a diode, and said means for automatically switching includes an electric switch for closing a shunt around said diode.

9. A device as set forth in claim 5 including a centrifugal blower having a light weight impeller driven at high speed by said motor.

10. A device as set forth in claim 1 including a centrifugal blower having a light weight impeller driven at high speed by said motor.

* * * * *